United States Patent

[11] 3,607,955

| | | | |
|---|---|---|---|
| [72] | Inventor | Lloyd E. Gardner<br>Bartlesville, Okla. | |
| [21] | Appl. No. | 719,712 | |
| [22] | Filed | Apr. 8, 1968 | |
| [23] | | Division of Ser. No. 398,442, Sept. 22, 1964, Pat. No. 3,413,369. | |
| [45] | Patented | Sept. 21, 1971 | |
| [73] | Assignee | Phillip Petroleum Company | |

[54] HYDROFLUORINATION AND DEHYDROFLUORINATION AND CATALYSTS THEREFOR
4 Claims, No Drawings

[52] U.S. Cl. .................................................... 260/653.5,
260/653.3, 252/442

[51] Int. Cl. ..................................................... C07c 21/18, C07c 17/34
[50] Field of Search .......................................... 260/653.5

[56] References Cited
UNITED STATES PATENTS

| | | | |
|---|---|---|---|
| 2,442,993 | 6/1948 | Cass ............................ | 260/653.5 |
| 2,461,523 | 2/1949 | Coffman et al. .............. | 260/653.5 |
| 3,118,005 | 1/1964 | Pavlath et al. ................ | 260/653.5 |

*Primary Examiner*—Daniel D. Horwitz
*Attorney*—Young and Quigg

ABSTRACT: Hydrofluorination and dehydrofluorination reactions are accomplished over a catalyst bed formed by heating a bed of particles of porous alumina to a temperature of at least 220° F. and flowing therethrough a gaseous mixture of HF and an inert diluent until the hot zone of chemical reaction has passed completely through said bed.

HYDROFLUORINATION AND DEHYDROFLUORINATION AND CATALYSTS THEREFOR

This is a divisional application of my copending patent application having Serial No. 398,442, filed Sept. 22, 1964, entitled "Hydrofluorination and Dehydrofluorination and Catalysts Therefor," now U.S. Pat. 3,413,369.

BACKGROUND OF THE INVENTION

This invention relates to chemical reactions involving hydrogen fluoride and organic compounds, and to catalysts for promoting these reactions. In one aspect, the invention relates to the preparation of a catalyst for hydrofluorination and dehydrofluorination reactions by contracting alumina with hydrogen fluoride. In another aspect, it relates to hydrofluorination of acetylenic hydrocarbons over an alumina/hydrogen fluoride catalyst. In another aspect, it relates to dehydrofluorination of gem-difluoro compounds with an alumina/hydrogen fluoride catalyst. In yet another aspect it relates to conversion of chloroethylene to fluoroethylene over an alumina/hydrogen fluoride catalyst. In still another aspect it relates to the separation of acetylenically unsaturated hydrocarbons from other hydrocarbons by means of hydrofluorination reactions.

The reaction of acetylenically unsaturated hydrocarbons with hydrogen fluoride over various aluminum containing catalysts is well documented in the prior art. Catalysts which have been mentioned for this application include alumina, aluminum fluoride, alumina-aluminum fluoride composite, alumina-antimony fluoride composite, alumina-cadmium fluoride composite, alumina-zinc fluoride composite, alumina-cobalt fluoride composite, aluminum sulfate, aluminum chloride, and aluminum chloride supported on alumina. The dehydrofluorination of gem-difluoro compounds to produce olefinically unsaturated monofluoro compounds is also known, and various catalysts have been used in this application. The prior art teachings, however, result in low conversion rates of the hydrocarbon to the fluoride, or an undesirably high ratio of saturated gem-difluoro compound to unsaturated monofluoro compound, or both.

It is an object of this invention to provide an improved process for the production of olefinically unsaturated monofluorides.

It is another object of this invention to provide an improved catalyst for hydrofluorination and dehydrofluorination reactions.

Another object is to produce a physically strong, active catalyst for selective monohydrofluorination reactions.

A further object of this invention is to provide an improved process for the interreaction of acetylene and hydrogen fluoride.

Another object of this invention is to provide an improved process for the dehydrofluorination of gem-difluoro compounds.

Still a further object of this invention is to produce vinyl fluoride.

These and other objects and advantages of this invention will become apparent, to one skilled in the art, from this specification and the appended claims.

SUMMARY OF THE INVENTION

In accordance with the practice of this invention, hydrofluorination and dehydrofluorination reactions are carried out in the presence of a catalyst prepared from the reaction of aluminum oxide with hydrogen fluoride gas at elevated temperatures. The catalyst formed by my method is physically strong, active, and highly selective for monohydrofluorination reactions.

The alumina used to prepare the catalyst is of a high porous, high surface area type. Preferably, the alumina is eta- or gamma-alumina; less preferably, the alumina may be bauxite. The alumina can be used alone for the catalyst formation, or it can be combined with a metal containing constituent. This constituent is a fluoride of zinc, chromium, cobalt, silver, copper, vanadium, iron, or nickel, or a salt, oxide, or other form convertible to a fluoride by the subsequent high temperature reaction with hydrogen fluoride. The metal containing constituent can be incorporated in the alumina in any convenient manner. For example, the metal compound can be ground with the alumina and the resulting composite then pelleted. Alternately, the alumina can be impregnated with a solution containing the metal. If desired, the alumina catalyst with or without the added metal containing constituent can be partially fluorided by treatment with a solution of ammonium fluoride, ammonium bifluoride, or hydrogen fluoride prior to the vapor phase fluoridation.

Under conditions of elevated temperature, the alumina or alumina-metal composite described above will react vigorously with hydrogen fluoride vapor, and the fluorine content of the resulting product represents a substantial conversion of the alumina to fluorine-containing compounds of aluminum. This reaction is highly exothermic, and if not controlled may produce sufficient heat to cause sintering of the catalyst. In order to prevent overheating, it is desirable that an inert diluent gas be mixed with the hydrogen fluoride used in the reaction. Although nitrogen is the preferred diluent, any other gas which is inert toward the catalysts, reactants, and products of this invention under the reaction conditions employed may be used, such as carbon dioxide, carbon monoxide, helium, neon, argon, and the like. The concentration of the diluent in the hydrogen fluoride will normally be maintained at 20–80 mol per cent, and preferably 40–60 mol percent.

To initiate the reaction at a desirable rate and to insure complete removal of water from the system, the temperature of the alumina is brought to a minimum of 220° F., and preferably to 250° F. As the diluent containing hydrogen fluoride is introduced to the bed of alumina, a zone of high exotherm will result, starting at the inlet side of the alumina bed, and advancing across the bed to the outlet. It is desirable to maintain the maximum temperature reached in the hot zone below 750° F., and preferably below 650° F. This temperature is controlled by the rate of gas flow through the bed, as well as by the ratio of the hydrogen fluoride to diluent in the gas stream. A flow rate of between 10 and 1,000, and more preferably between 50 and 500, volumes (standard conditions) per volume of catalyst per hour is normally maintained. The gas flow is continued until the hot reaction zone has passed completely through the catalyst, at which time a copious amount of hydrogen fluoride is observed in the effluent gas.

The nature of the chemical compound formed by this reaction is undetermined, but it is believed to be some type of oxyfluoride or a combination of oxides, fluorides, and oxyfluorides. The fluoride content of the catalyst is in the range of 50–60 per cent. This is well below the theoretical content of fluoride in aluminum trifluoride. Additionally, hydrofluorination reaction yields with my catalyst are greatly in excess of those obtainable by using aluminum trifluoride itself as the catalyst.

DESCRIPTION OF PREFERRED EMBODIMENTS

The acetylenic hydrocarbons which I prefer to use in the hydrofluorination reaction employing the above catalyst have the formula

wherein R is selected from the group consisting of hydrogen and alkyl and alkenyl radicals containing 1 to not more than 8 carbon atoms, and preferably with the total number of carbon atoms in the acetylenic hydrocarbon not exceeding 10. Some examples of these preferred acetylenic hydrocarbons are:

acetylene
propyne
1-butyne
2-butyne
2-pentyne
1-hexyne
3-octyne 2-decyne
3-methyl-1-pentyne
2,5'-dimethyl-3-hexyne
1-penten-4-yne
1-hexen-5-yne
2-hepten-5-yne
3-ethyl-1-octen-6-yne
1,8-nonadien-4-yne.

The acetylenic hydrocarbons containing no unsaturation other than the carbon-to-carbon triple bond are more preferred than those containing alkenyl groups, which tend to make the hydrocarbon more susceptible to undesired side reactions. In the hydrofluorination of these acetylenic hydrocarbons, the elements of hydrogen fluoride add to the triply bonded carbon atoms in conformance with the Markownikoff rule to give a fluoroalkene or fluoroalkapolyene in which the fluorine atom is attached to one of the carbon atoms adjacent the newly formed double bond. A gem-difluoroalkane, gem-difluoroalkene, or gem-difluoroalkadiene is formed as a minor product through the addition of the elements of two molecules of hydrogen fluoride to the triply bonded carbon atoms. The difluoro compound is readily converted to the desired fluoroalkene or fluoroalkapolyene by recycling over the catalyst of this invention.

In the hydrofluorination reaction, the mol ratio of hydrogen fluoride to acetylenic hydrocarbon is in the range of 0.2:1 to 20:1 and preferably between 1:1 and 2:1. Lower ratios result in lower conversion of the acetylenic hydrocarbon, and higher ratios give larger amounts of the gem-difluoro compound. The flow rate of the reaction mixture is from 50 to 5,000, and preferably from 200 to 1,000, volumes (standard conditions) per volume of catalyst per hour. The temperature in the reaction zone is maintained between 500° F. and 750° F. Generally a temperature of 600° to 700° F. is used. As a matter of convenience, pressures are generally atmospheric, but higher or lower pressures may be employed when desired.

The hydrofluorination reaction can be employed to separate acetylenic hydrocarbons from mixtures containing olefinic or paraffinic hydrocarbons by means of the specific addition of HF to the triple bond. Subsequent separation of the fluorinated product from the hydrocarbons is readily accomplished by fractionation or other suitable means. In this application, the conditions specified above are observed, except that positive pressures as high as 1,000 p.s.i.g. are to be preferred, and that a wider temperature range is permissible, generally from 400° F. to 800° F. being suitable.

Although the invention has general application in the removal of acetylenic hydrocarbons from other unsaturated and saturated hydrocarbons, its greatest utility resides in its use to separate acetylenic hydrocarbons from other hydrocarbons of similar boiling point or molecular weight. As examples, acetylene may be removed from streams containing ethylene and/or ethane; propyne can be separated from propylene and/or propane; and butynes can be separated from butenes and/or butanes.

The dehydrofluorination reactions of my invention are performed with compounds having the formula

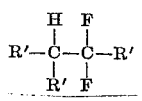

where R' is selected from the group consisting of hydrogen and alkyl and alkenyl radicals containing not more than eight carbon atoms, the total number of carbon atoms in the gem-difluoro compound preferably not exceeding 10. Some examples of these preferred gem-difluoro compounds are:
1,1-difluoroethane
1,1-difluoropropane
2,2-difluoropropane
1,1-difluorobutane
2,2-difluorobutane
2,2-difluoropentane
2,2-difluorohexane
3,3-difluorooctane
1,1-difluorodecane
2,2-difluorodecane
2,2-difluoro-3-methylpentane
3,3-difluoro-2,5-dimethylhexane
4,4-difluoro-1-pentene
5,5-difluoro-1-hexene
6,6-difluoro-2-heptene
6,6-difluoro-3-ethyl-1-octane
4,4-difluoro-1,7-octadiene.

The saturated difluoro compounds are more preferred than those containing olefinic unsaturation.

In the dehydrofluorination of gem-difluoro compounds, the elements of hydrogen fluoride are removed from adjacent carbon atoms to produce the fluoroalkene or fluoroalkapolyene. When the difluoromethylene group is between two carbon atoms, to each of which is attached at least one hydrogen atom, isomeric fluoroalkenes and fluoroalkapolyenes are produced in a ratio dependent on the nature of the gem-difluoro compound and on the dehydrofluorination conditions.

Reaction conditions for the dehydrofluorination reaction according to this invention are flow rates of 10 to 1,000, and preferably 50 to 200, volumes (standard conditions) per volume of catalyst per hour, and a reaction temperature of 500° F. to 900° F., generally in the range of 675° F. to 725° F. The pressure is substantially atmospheric, although higher or lower pressures may be employed, as desired.

The catalyst of my invention can also be used to form fluoroethylene by a substitution reaction between HF and chloroethylene. In this embodiment, the mol ratio of hydrogen fluoride to chloroethylene is between 0.1:1 and 10:1, preferably between 1:1 and 2:1. Flow rate of the reactants can be 10–1,000 volumes, although a rate of 100–300 volumes (standard conditions) per volume of catalyst per hour is generally used. Temperatures of 300°–800° F. can be used, and 550°–700° F. is preferred. Pressures are generally atmospheric, although higher or lower pressures can be used.

Small amounts of carbonaceous material will deposit on the catalyst while performing the various reactions, and over a period of time these deposits will cause a reduction in the efficiency of the reaction. These deposits may be removed periodically and the catalyst regenerated by passing over the catalyst dry air or oxygen, with or without a diluent, at a temperature of 600°–950° F. Minor amounts of fluorine are lost from the catalyst during this regeneration, but may readily be replaced by exposing the catalyst to hydrogen fluoride vapor for about 1 hour at a temperature of 600°–675° F.

In the following examples, the data are presented as being typical of the invention, and such data should not be construed to limit the invention unduly.

EXAMPLE I

A fluorided alumina catalyst was prepared by passing a dry stream of hydrogen fluoride containing 50 volume percent nitrogen over 200 ml. of dried gamma-alumina (surface area = 180 square meters per gram) in the form of ⅛-inch pills. The flow rate of the gaseous mixture was 200 volumes per volume of catalyst per hour. The initial temperature of the catalyst was 280° F. The gas was passed through the catalyst bed for 4 hours, during which time a hot reaction zone at about 620° F. moved through the bed. The resulting catalyst contained 53 percent fluorine and had a surface area of 29 square meters per gram. The pill strength was 26 pounds, as compared with 17 pounds for the original alumina.

EXAMPLE II

A mixture of metered streams of acetylene and hydrogen fluoride was passed over the catalyst prepared in Example I. The catalyst temperature was maintained at 675° F. The total flow rate of the reactants was 420 volumes per volume of catalyst per hour; the pressure was atmospheric. The mol ratio of hydrogen fluoride to acetylene was 1.6:1. The reactor ef- fluent, consisting of hydrogen fluoride, acetylene, fluoroethylene and 1,1-difluoroethane, was passed through scrubbing towers to remove unreacted hydrogen fluoride; moisture was then removed with Drierite. The dry gas free of hydrogen fluoride was passed to a meter for volume measurement, and the composition of the gas was determined by averaging the gas chromatographic analyses made hourly during a 6-hour run. The HF-free product thus obtained was 7 mol percent acetylene, 80 mol percent fluoroethylene, and 13 mol percent 1,1-difluoroethane, representing a 93 percent conversion of acetylene. The yield of fluoroethylene was 1.35 g./g. of acetylene charged.

EXAMPLE III

Another fluoride alumina catalyst was prepared by passing a dry stream of hydrogen fluoride containing approximately 50 volume percent nitrogen over 200 ml. of eta-alumina in the form of ⅛-inch pills. The average flow rate of the hydrogen fluoride component was 40 volumes per volume of catalyst per hour. The initial temperature of the catalyst was 280° F. The gas was passed through the catalyst bed for 4 hours, during which time a reaction zone at about 525° F. moved through the bed. The resulting catalyst contained 58.6 percent fluorine and had a surface area of 27 square meters per gram. The pill strength was 19 pounds, as compared with 8.2 pounds for the original alumina.

EXAMPLE IV

By the general method described in Example II, acetylene and hydrogen fluoride were allowed to react in the presence of the catalyst prepared in Example III. The mol ratio of hydrogen fluoride to acetylene was 1.3:1, and the total flow rate of the reactants was 195 volumes per volume of catalyst per hour. The pressure was atmospheric. The catalyst temperature was maintained at 620° F. Conversion of the acetylene was 96 percent complete, and the ratio of fluoroethylene to 1,1-difluoroethane was 3.2:1.

EXAMPLE V

To demonstrate the use of my invention to remove acetylenic hydrocarbons from a mixed hydrocarbon stream, in a series of runs, mixtures of various concentrations of acetylene, ethylene and hydrogen fluoride were passed for 6 hours at atmospheric pressure over 150 ml. of a catalyst prepared in similar manner to that of Example III, above. Feed compositions were checked periodically by gas chromatographic analysis. The effluent from the reactor containing the catalyst was passed through aqueous sodium hydroxide to remove unreacted hydrogen fluoride. The HF-free gas was then metered, dried and passed to an on-stream sampling system for chromatographic analysis; the analyses were made hourly and averaged to obtain representative values for a given experiment. In all of the experiments, 99 to 100 percent of the ethylene was recovered, as determined by volume measurements and gas chromatographic analysis, and 87 to 92 percent of the acetylene was converted to fluoroethylene and 1,1-difluoroethane, based on gas chromatographic analysis of the acid-free reactor effluent. These values for acetylene conversion do not include the small amounts (approximately 1 percent) of acetylene which are normally left on the catalyst as a cokelike deposit. Mass spectrometer analysis indicated there was no fluoroethane in the reaction product. The conversions of acetylene and ethylene are summarized in table I, together with the corresponding feed compositions, total feed flow rates, and catalyst temperatures. Table II shows the compositions of the HF-free reacted effluent, calculated on an ethylene-free basis from each of the corresponding experiments in table I.

TABLE I

| Experiment | Feed composition, mole percent | | | Total flow rate, vol./vol./hour | Catalyst temperature, °F. | Conversion, percent | |
|---|---|---|---|---|---|---|---|
| | HF | $C_2H_2$ | $C_2H_4$ | | | $C_2H_2$ | $C_2H_4$ |
| 1 | 75 | 0 | 25 | 333 | 660 | -------- | <1.0 |
| 2 | 41 | 22 | 37 | 353 | 675 | 90 | 0 |
| 3 | 32 | 25 | 43 | 305 | 660 | 87 | 0 |
| 4 | 58 | 33 | 9 | 477 | 670 | 87 | 0 |
| 5 | 57 | 34 | 9 | 462 | 690 | 89 | 0 |
| 6 | 57 | 43 | 0 | 375 | 675 | 92 | -------- |

TABLE II

| Exp. | Effluent Composition, Mole %* | | |
|---|---|---|---|
| | $C_2H_2$ | $CH_2=CHF$ | $CH_3CHF_2$ |
| 1 | - | - | - |
| 2 | 10 | 79 | 11 |
| 3 | 13 | 81 | 6 |
| 4 | 13 | 68 | 19 |
| 5 | 11 | 72 | 17 |
| 6 | 8 | 82 | 10 |

*—After removal of hydrogen fluoride, and calculated on an ethylene-free basis.

Thus, acetylene, by conversion to fluoroethylene and 1,1-difluoroethane, was largely removed from streams containing acetylene and ethylene, whereas the ethylene remained unreacted.

EXAMPLE VI

After the catalyst prepared in Example III had been used in the hydrofluorination of acetylene for 40 hours following its fifth reactivation with air, it was reactivated by passing dry air through the reactor containing the catalyst at an initial temperature of 800° F. The flow rate of the air was controlled at about 150 volumes per volume of catalyst per hour so as to prevent the temperature of the hot zone which moved through the catalyst bed from exceeding 950° F., thereby avoiding sintering of the catalyst. Determination of the carbon oxides produced during the combustion showed the carbon content of the catalyst prior to reactivation to have been 10.4 weight percent. Fluorine loss during the combustion was 3.0 weight percent of the fluorine initially present; this loss was determined by absorption of the evolved hydrogen fluoride in water, and subsequent titration with standard base. After the combustion was completed, the catalyst chamber was flushed with nitrogen, and the catalyst temperature was lowered to 600°–675° F. Hydrogen fluoride was then passed over the catalyst at 600°–675° F. for about 1 hour to replace the fluorine lost during the combustion.

To demonstrate the effectiveness of the reactivated catalyst, results obtained in the hydrofluorination of acetylene during 6-hour runs immediately preceding and immediately following the reactivation were compared. In each of these runs hydrogen fluoride and acetylene in an $HF/C_2H_2$ mole ratio of 1.4 were passed, at atmospheric pressure and at a total flow rate of 400 volumes per volume of catalyst per hour, over the catalyst maintained at a temperature of 675° F. The table below shows the acetylene conversion, mole ratio of fluoroethylene to 1,1-difluoroethane in the product, and per pass yield of fluoroethylene obtained in each of the 6-hour runs. From the table it can be seen that reactivation rendered the catalyst improved with respect to acetylene conversion and fluoroethylene yield. Although the reactivated catalyst gave a lower ratio of fluoroethylene to 1,1-difluoroethane, other runs have shown that this ratio increases with continued use of the catalyst following reactivation.

Before Catalyst Reactivation

| Conv.,% | $CH_2=CHF/CH_3CHF_2$ Mole Ratio in Product | Per Pass Yield, g. $CH_2=CHF$ per g. $C_2H_2$ charged |
|---|---|---|
| 81 | 5.4 | 1.2 |

After Catalyst Reactivation

| $C_2H_2$ Conv.,% | $CH_2=CHF/CH_3CHF_2$ Mole Ratio in Product | Per Pass Yield, g. $CH_2=CHF$ per g. $C_2H_2$ charged |
|---|---|---|
| 95 | 4.7 | 1.3 |

EXAMPLE VII

A fluorided alumina catalyst was prepared by passing a dry stream of hydrogen fluoride containing 50 volume percent nitrogen over 200 ml. of eta-alumina for a period of 4 hours. The catalyst temperature at the beginning of the fluoride treatment was 280° F. During the 4-hour treatment the temperature of the catalyst rose to a maximum of 640° F. as the reaction zone passed through the catalyst bed, then decreased to a value approaching the initial temperature. The flow rate of the combined hydrogen fluoride and nitrogen was 200 volumes per volume of catalyst per hour. The resulting catalyst, after being used in the preparation of fluoroethylene from acetylene and hydrogen fluoride in three runs totaling 15 hours in reaction time, was employed in the experiment in Example VIII, at which time the catalyst contained about 59.4 percent fluorine, had a pill strength of about 19 pounds, and had a surface area of about 20 square meters per gram.

EXAMPLE VIII

A mixture of metered streams of hydrogen fluoride and chloroethylene was passed over the catalyst prepared in Example VII. The catalyst temperature was maintained at 650° F. The total flow rate of the reactants was 178 volumes per volume of catalyst per hour; the pressure was atmospheric. The mol ratio of hydrogen fluoride to chloroethylene was 1.37:1. The reactor effluent was passed through scrubbing towers to remove hydrogen fluoride and hydrogen chloride; moisture was then removed with Drierite. The dry gas free of hydrogen fluoride and hydrogen chloride was passed to a meter for volume measurement, and the composition of the gas was determined by averaging the gas chromatographic analyses made hourly during a 6-hour run. The dry gas thus analyzed was 0.9 mol percent acetylene, 4.6 mol percent fluoroethylene, 1.8 mol percent 1,1-difluoroethane, and 92.7 mol percent chloroethylene. Thus, 7.3 percent of the chloroethylene was converted, 63 percent of the converted portion yielding the desired fluoroethylene.

No conversion occurred when chloroethylene alone, in the absence of hydrogen fluoride, was passed over the same catalyst under similar conditions.

EXAMPLE IX

A fluoride alumina catalyst was prepared from gamma-alumina and hydrogen fluoride by the method of Example I. After having been used in the hydrofluorination of acetylene, this catalyst contained 55.3 percent fluorine and had a surface area of 10 square meters per gram. The catalyst was then used in the dehydrofluorination of 1,1-difluoroethane to fluoroethylene at various temperatures within the range of about 550° F. to 770° F. In each instance 1,1-difluoroethane was passed over the catalyst at a flow rate of 75 volumes per volume of catalyst per hour; the pressure was atmospheric.

The effluent, after removal of hydrogen fluoride with aqueous potassium hydroxide, was analyzed by gas chromatography. In the table below are summarized the degree of conversion of the 1,1-difluoroethane and the composition of the hydrogen fluoride-free effluent obtained in runs carried out at various dehydrofluorination temperatures.

DEHYDROFLUORINATION OF 1,1-DIFLUOROETHANE

| Temperature, °F. | $CH_3CHF_2$ conversion percent | HF-free effluent composition, mole percent | | |
|---|---|---|---|---|
| | | $CH=CH$ | $CH_2=CHF$ | $CH_3CHF_2$ |
| 565 | 55 | 1.0 | 54.4 | 44.6 |
| 590 | 57 | 0.8 | 55.9 | 43.3 |
| 610 | 74 | 1.8 | 72.0 | 26.2 |
| 655 | 85 | 5.0 | 80.2 | 14.8 |
| 690 | 89 | 7.0 | 81.7 | 11.3 |
| 695 | 89 | 7.0 | 81.8 | 11.2 |
| 745 | 94 | 15.7 | 78.4 | 5.9 |
| 750 | 94 | 16.4 | 77.4 | 6.2 |
| 770 | 95 | 24.7 | 70.7 | 4.6 |

It will be understood that the preceding examples have been given for illustrative purposes solely and that my invention is not limited to the specific embodiments shown therein. Many variations and modifications may be made within the scope of the general disclosure without departing from the spirit of my invention.

From the preceding description and examples, it will be seen that I have discovered a new catalytic composition for performing hydrofluorination and dehydrofluorination reactions. The catalyst is physically strong, active, and selective for the production of monofluorinated olefinic hydrocarbons.

I claim:

1. The process which comprises heating a bed of particles of porous alumina selected from eta-alumina, gamma-alumina, and bauxite to a temperature of at least 220° F. and flowing therethrough a gaseous mixture of HF and an inert diluent until the hot zone of chemical reaction is passed completely through the bed and subsequently passing through the bed a gem-difluoro compound of the general formula

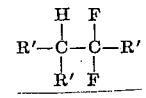

wherein each R' is selected from the group consisting of hydrogen, alkyl and alkenyl radicals, containing not more than 8 carbon atoms with the total number of carbon atoms in the molecule preferably not exceeding 10, said bed being maintained between 500° F. and 900° F. during passage of said difluoro compound.

2. The process of dehydrofluorinating a gem-difluoro compound of the formula

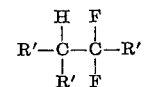

wherein each R' is selected from the group consisting of hydrogen, alkyl and alkenyl radicals containing not more than 8 carbon atoms with the total number of carbon atoms in the molecule preferably not exceeding 10, which comprises passing a gaseous mixture of said difluoro compound through a bed of catalysts held at a temperature between 500° F. and 900° F., said catalyst having been prepared by heating a bed of porous alumina selected from eta-alumina, gamma-alumina and bauxite to a temperature of at least 220° F. and flowing therethrough a gaseous mixture of HF and an inert diluent until the hot zone of chemical reaction has passed completely through said bed.

3. The process of producing vinyl fluoride which comprises preparing a catalyst by heating a bed of porous alumina selected from eta-alumina, gamma-alumina and bauxite to a temperature of at least 220° F. and flowing therethrough a gaseous mixture of HF and nitrogen in approximately equal molar volumes at a flow rate of 50 to 500 volumes of gas per volume of catalyst per hour, maintaining the bed temperature below 650° F. and continuing the gas flow until the hot reaction zone has passed completely through the bed, and subsequently passing 1,1-difluoroethane through the catalyst so prepared at a flow rate of 50 to 200 volumes of gas per volume of catalyst per hour, while maintaining the catalyst bed at a temperature of 675° F. to 725° F.

4. The process of producing vinyl fluoride which comprises preparing a catalyst by heating a bed of porous alumina selected from eta-alumina, gamma-alumina and bauxite and a metal containing compound selected from the group composed of the fluorides of zinc, chromium, cobalt, silver, copper, vanadium, iron, nickel, and compounds of these metals convertible to fluorides, to a temperature of at least 220° F. and flowing therethrough a gaseous mixture of HF and nitrogen of approximately equal molar volumes at a flow rate of 50 to 500 volumes of gas per volume of catalyst per hour, maintaining the bed temperature below 650° F. and continuing the gas flow until the hot reaction zone has passed completely through the bed, and subsequently passing 1,1-difluoroethane through the catalyst so prepared at a flow rate of 50 to 200 volumes of gas per volume of catalyst per hour, while maintaining the catalyst bed at a temperature of 675° F. to 725° F.